United States Patent Office 3,454,952
Patented July 8, 1969

3,454,952
THREE-PEN CHART RECORDER WITH INDIVIDUAL PEN LIFTING MECHANISMS
Samuel J. Harkins, Lansdale, Pa., assignor to Leeds & Northrup Company, Philadelphia, Pa., a corporation of Pennsylvania
Filed Feb. 21, 1968, Ser. No. 707,113
Int. Cl. G01d 15/16
U.S. Cl. 346—17                                                7 Claims

ABSTRACT OF THE DISCLOSURE

A multiple pen strip chart recorder with individual nonrotatable pen carriages which each support a nontiltable pointer for cooperation with a scale and a pivotally supported liftable pen and wherein each carriage is slideable along pairs of guide rods with one rod of each pair being rotatable for lifting its pivotally supported pen from contact with the chart without affecting the pointer.

Background of the invention

This invention relates generally to strip chart recorders and more specifiically, to an improved pen carriage, pointer, and pen lifter assembly for such recorders.

A recorder wherein a chart is moved transversely past a pen movable across the chart in response to change in the value of a measured quantity enjoys a high degree of popularity for a large variety of measurement applications where a permanent record is desired. In this type of recorder, a pen carriage is caused to move along a guide structure and carries a pen for marking a chart and a pointer for indicating on a scale independent of the moving chart the instantaneous value of the quantity being measured. Some recorders of this type have a plurality of pens for independently recording different variables on a single chart.

In prior art recorders having three or more pens, the arrangement of parts has been such that one or more of the pens have been placed in front of one or more of the instrument scales so that a times the portion of a scale associated with one of the indicating pointers has been partially obscured. Additionally, the indicating pointer carried by some of the rotatable pen carriages moved toward and away from its corresponding scale as the pen carried by the carriage moved from or to the chart upon actuation of a pen lifter mechanism thereby introducing a confusing change in the parallax error. Furthermore, such recorders employed indicating pointer arrangements having a portion crossing over a scale other than the one intended for use with the indicator with resultant confusion.

Summary of the invention

This invention incorporates a novel arrangement of parts for a recorder having a plurality of pens whereby each pen may move toward and away from the recorder chart without corresponding movement of the indicating pointer away from and toward its associated scale. Additionally, each pointer may be associated with its own scale in a manner which avoids cross-over structures. Furthermore, each pen may be lifted independently by mechanism free of critical adjustments.

In a preferred embodiment of the invention a nonrotatable pen carriage which travels along two guide rods in response to changes in a signal being recorder carries a pivotally supported pen for marking on a chart and a nontiltable pointer for indicating along a scale. A captive eccentric cam, which is keyed to and slideable along a guide rod, rotates as a result of rotation of its associated guide rod and cooperates with a cam follower associated with the pivotally supported pen to lift the pen from the chart in a positive and smooth manner, no matter where the pen carriage happens to be along the length of the guide rods. Such a configuration allows the pen to be lifted without affecting the relationship between a pointer carried by the pen carriage and its associated scale and thereby minimizes undesirable different parallax effects when the pen is contacting the paper or is in a lifted position. This configuration further allows the pens to be entirely behind their scales and facilitates the use of a plurality of pen carriages and pens for multi-channel recording with each pen lift mechanism operating independently and without effect upon the pointer associated with its scale.

To enable any person skilled in the art to understand the invention and applications thereof in its preferred embodiments, the following description is presented which should be taken in conjunction with the accompanying drawings.

Description of the preferred embodiments

Figure 1:
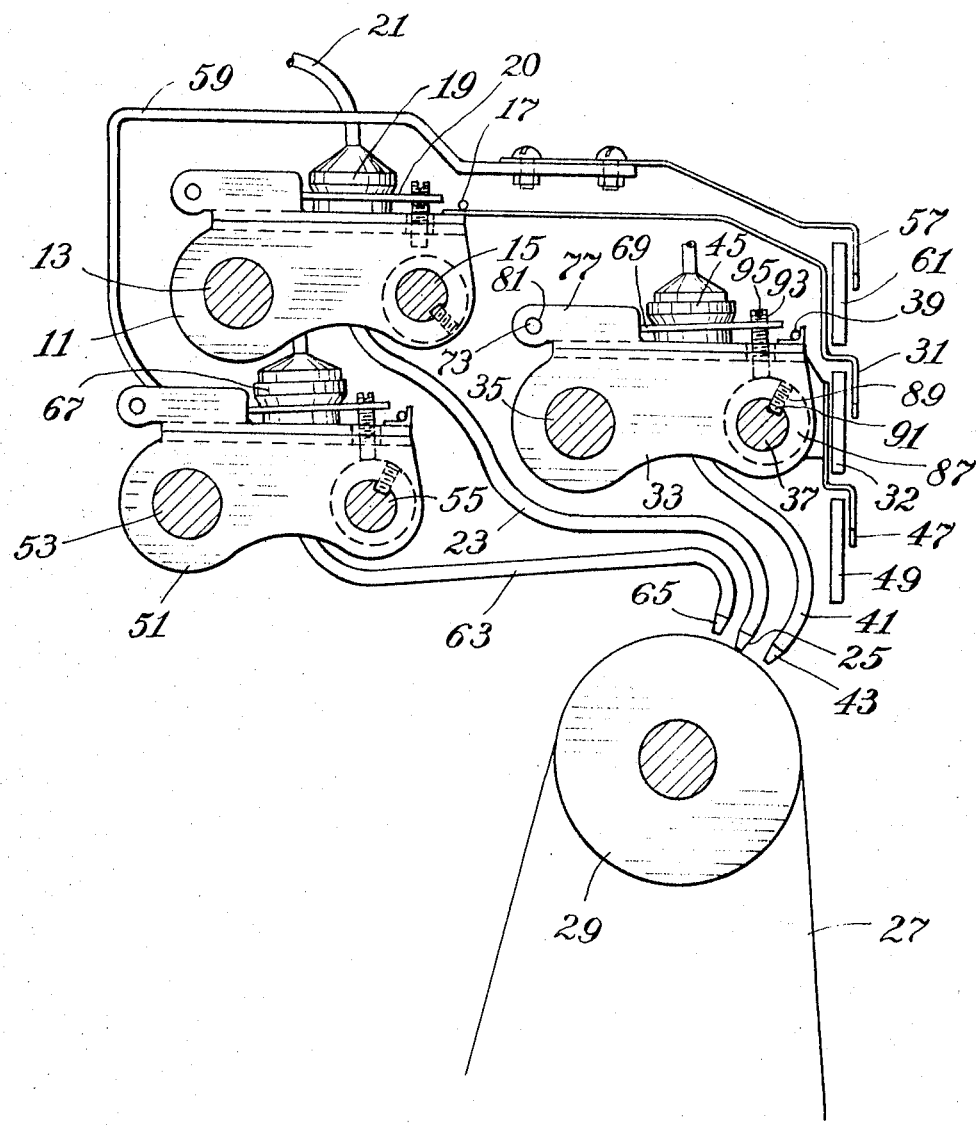
FIG. 1 is an end view partly in section of one embodiment of the present invention in which the pens and pen carriages move in a plane perpendicular to that of the paper in response to a signal or signals being recorded.

For a general description of the essential elements of a recorder incorporating therein the present invention according to a preferred embodiment, reference should be had to all three figures in which common parts take on the same reference numbers. A pen carriage 11 slides in a direction perpendicular to the plane of the paper along a rear guide rod 13 and a front guide rod 15 from force imparted by a driving means (not shown) operating in response to a condition being measured through a carriage drive cable 17. A surge pot 19 supported by a pivoted plate 20 receives a plug-in capillary tube 21 which terminates in an ink reservoir (not shown). The surge pot 19 supports a capillary pen 23 which has a pen nib 25 for contacting a chart 27 moved past the pen by a chart drive roll 29. A pointer 31 is rigidly attached to the carriage 11 and cooperates with a scale 32 to provide a visual indication of the magnitude of the condition being measured.

A second pen carriage 33, similar to the pen carriage 11, slides along a rear guide rod 35 and a front guide rod 37 in response to force applied through a carriage drive cable 39 which is fixedly attached to the pen carriage 33. A capillary pen 41 which has a pen nib 43 for contacting the paper 27 is connected to a surge pot 45 supported by a pivoted plate 69. An ink supply capillary tube not shown is understood to exist. A pointer 47 is rigidly connected to the pen carriage 33 and cooperates with a scale 49 to provide a visual indication of the value of the condition being measured.

Similarly, a third carriage 51 slides along guide rods 53 and 55 and has a pointer 57 fixedly connected to the pen carriage 51 through a rigid member 59 which provides an indication on a scale 61 of the instantaneous magnitude of the condition being measured. A capillary pen 63 has a pen nib 65 for contacting the paper 27 and is connected to a surge pot 67 which in turn is supported by the pen carriage 51.

A multipen recorder such as the one illustrated in FIG. 1 has the advantage of being able to record a plurality, in this case three, independent varying electrical signals on one chart. The configuration shown has the advantage over known prior art devices in that the capillary pens 23, 41 and 63 do not cross over any of the scales 32, 49 or 61. This is possible since the pointers 31, 47 and 57 are supported from respective pen carriages independently of the pens. Since it is often desired to lift a pen from the paper to stop recording, it is advantageous to have the independent pointer as utilized herein which will always give an accurate reading whether the pen be raised or in contact with the paper. The three or more pen prior art machines known to applicant have a pointer connected to or part of the liftable pen which creates undesirable changes in the parallax of the pointer with the scale when the pen is lifted.

Figure 2:
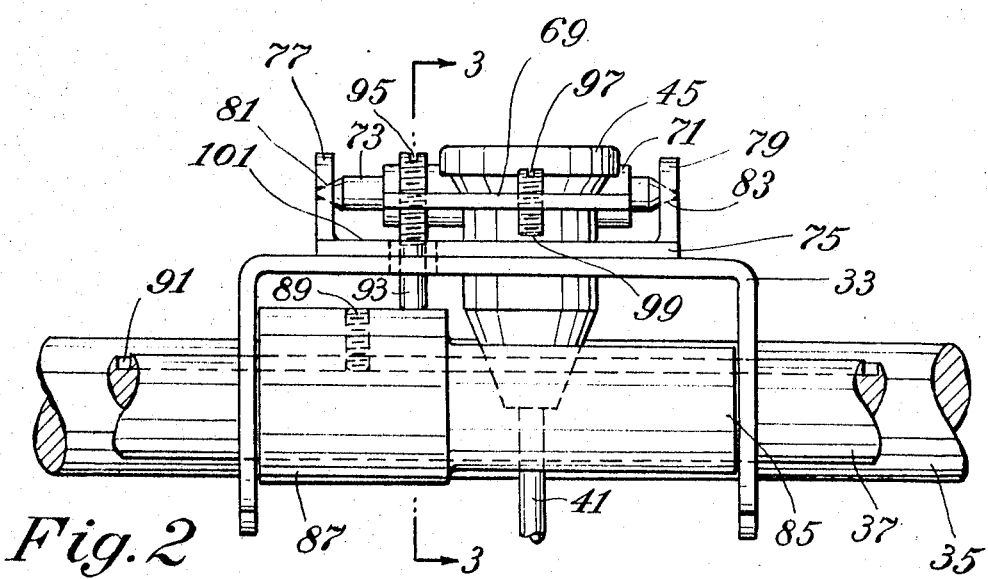
FIG. 2 is a front view of a typical pen carriage and associated mechanism according to the present invention.
Figure 3:
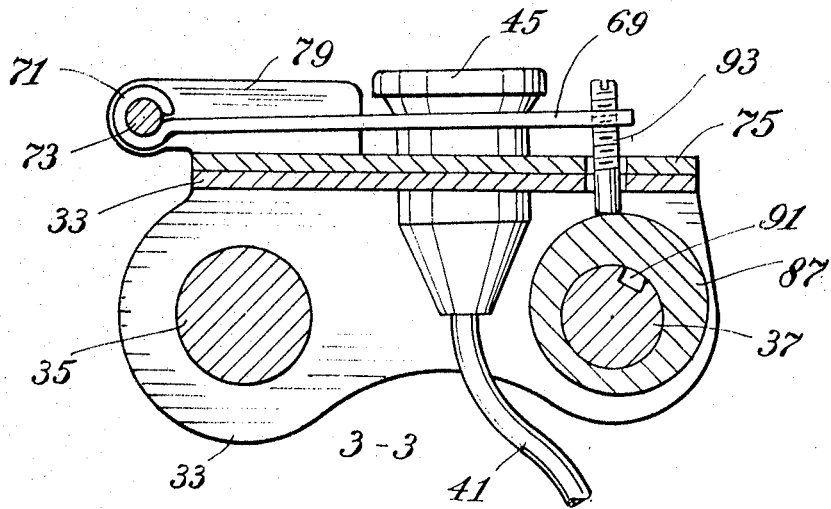
FIG. 3 is a cross-sectional view of a typical pen carriage according to the present invention taken along the line of 3—3 of FIG. 2.

With reference to FIGS. 2 and 3, the details of the pen lifting mechanism within each pen carriage can be better understood. For simplicity in explanation, only the pen carriage 33 is shown in different views in FIGS. 2 and 3 but it is understood that these views are representative also of pen carriages 11 and 51 with minor modifications not important for an understanding of the present invention. The pivoted pen support plate 69 supports the surge pot 45 so that movement of this plate will also result in movement of the rigid capillary pen 41. A rolled end 71 of the pen support plate 69 is attached to a pivot shaft 73. Pivot support bracket 75 has upturned ears 77 and 79 which include bearing surfaces 81 and 83 for the conical ends of pivot shaft 73.

A captive pen lifter sleeve 85 is a slide fit on the forward guide rod 37 and is constrained to move along this rod with the pen carriage 33. The sleeve 85 has an eccentric cam portion 87. The pen lifter sleeve 85 is fixed against rotation with respect to the forward guide rod 37 while slideable therealong by means of a pin 89 which is a force fit in a hole or threadably attached to the eccentric portion 87 of the sleeve 85 and projects into a groove 91 of the forward guide rod 37. The end of the pin 89 is a sliding fit in the groove 91 to permit the sleeve 85 to slide therealong. The eccentric portion 87 cooperates with a cam follower 93 to raise and lower the pen support plate 69 when the pen lifter sleeve 85 is rotated as a result of rotation of the forward guide rod 37 by manual or automatic means. It should be noted that as the pen carriage 33 slides along the guide rods 35 and 37, the pen lifter sleeve 85 is captive between the turned down bearing elements of carriage 33 and slides along the forward guide rod 37. The cam follower 93 is threaded, and mounted in a tapped hole in plate 69 and is provided with a screwdriver slot 95 for adjustment of the position of the pen nib 43 relative to the paper 27 during a full oscillation of the eccentric cam 87.

It can be seen therefore, that this configuration provides a pen carriage 33 that does not have to be rotated in order to lift its capillary pin nib 43 from contact with the paper 27. The two guide rods 35 and 37 provide stability to the pen carriage 33. Furthermore, the slotted guide rod 37 serves to control raising and lowering of the capillary pen nib 43 without rotation of the pen carriage. Giving this dual function to one guide rod eliminates the necessity for a further element to raise the pen nib. Also, the use of a short eccentric cam provides smooth motion at low cost.

Another feature of this invention is the provision of simple and convenient means for controlling the contact between the pen nib 43 and the chart 27. As shown in FIG. 2, there is a pen nib wipe adjustment screw 97 which is threadably attached to the pen support plate 69. An end surface 99 of the adjustment screw 97 will travel until it meets a surface 101 of the pivot support bracket 75 and thereby control the distance that the pen nib 43 moves toward chart 27. This is useful when, for instance, the chart drive roll 29 is moved downwardly and away to change the chart 27.

What is claimed is:
1. A recorder for making a record of a condition under investigation, comprising:
   a nonrotatable pen carriage supported by a plurality of guide rods and slideable therealong in response to changes in the condition under investigation,
   a pen pivotally attached to said carriage for recording its movement on a chart, and
   a cam surface constrained to move along one of said guide rods in response to movement of said pen carriage, said cam surface rotatable by said guide rod and operably connected to said pen through a cam follower for lifting said pen from said chart in response to rotation of said guide rod.

2. A recorder according to claim 1 wherein there are only two guide rods.

3. A recorder according to claim 1 including a nontiltable pointer supported by said pen carriage for indicating along a scale the magnitude of the condition under investigation.

4. A recorder according to claim 1 wherein said cam surface is circular with a center of curvature displaced from the axis of rotation of the guide rod to which said cam is rotatably attached.

5. A recorder for making a record of a condition under investigation, comprising:
   a nonrotatable pen carriage supported by first and second guide rods and slideable therealong in response to changes in the condition under investigation,
   a pen pivotally attached to said carriage for recording the movements of said carriage on a chart,
   a sleeve surrounding a portion of said first guide rod and slideable along its length in response to movement of said carriage, said sleeve being rotatably fixed to said guide rod,
   an eccentric cam portion fixed to said sleeve, and
   a cam follower operably connected to cause said pen to lift from said chart under the action of the eccentric cam portion when said first guide rod is rotated.

6. A recorder according to claim 5 wherein said first guide rod is circular and wherein said sleeve is rotatably fixed to said first guide rod and slideable along its length by a key fixed to said sleeve and slideable within an axially aligned groove of said first guide rod.

7. A recorder for making a record of a condition under investigation of the type which includes a carriage carrying a pen for contact with a chart and movable along a guide structure in response to changes in the condition under investigation, and means for lifting said pen from said chart when it is desired to stop recordation, the improvement characterized by:
   said pen being pivotally supported from said pen carriage, and said guide structure including a rotatable rod,
   said means for lifting said pen comprising a cam held captive by a structure of said pen carriage and constrained to move axially along said rotatable rod with said pen carriage, said cam being rotatable by said rod and operably connected to said pen through a cam follower for lifting said pen from the chart in response to rotation of said rod.

References Cited
UNITED STATES PATENTS
2,655,426    10/1953    Barnes _____ 346—68 X
2,806,758    9/1957    Butler et al. _____ 346—139 X RICHARD B. WILKINSON, *Primary Examiner.*

J. W. HARTARY, *Assistant Examiner.*

U.S. Cl. X.R.

346—139

UNITED STATES PATENT OFFICE
CERTIFICATE OF CORRECTION

Patent No. 3,454,952                                         July 8, 1969

Samuel J. Harkins

It is certified that error appears in the above identified patent and that said Letters Patent are hereby corrected as shown below:

Column 4, line 35, after "said" insert -- first --.

Signed and sealed this 10th day of February 1970.

(SEAL)
Attest:

Edward M. Fletcher, Jr.                         WILLIAM E. SCHUYLER, JR.
Attesting Officer                                     Commissioner of Patents